(12) United States Patent
Xie

(10) Patent No.: US 9,746,726 B2
(45) Date of Patent: Aug. 29, 2017

(54) LIQUID CRYSTAL DISPLAY, A METHOD IMPROVING THE RESPONSE TIME THEREOF, AND AN ARRAY SUBSTRATE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/000,945

(22) Filed: Jan. 19, 2016

(65) Prior Publication Data
US 2017/0139288 A1   May 18, 2017

(30) Foreign Application Priority Data
Nov. 13, 2015 (CN) .......................... 2015 1 07803744

(51) Int. Cl.
G02F 1/1343 (2006.01)
G02F 1/1333 (2006.01)
G02F 1/1335 (2006.01)

(52) U.S. Cl.
CPC .. *G02F 1/134363* (2013.01); *G02F 1/133345* (2013.01); *G02F 1/133514* (2013.01); *G02F 1/134309* (2013.01)

(58) Field of Classification Search
CPC ......... G02F 1/134363; G02F 1/133753; G02F 1/134309; G02F 1/134336; G02F 1/133345; G02F 1/133; G02F 1/13306; G02F 2001/133757; G02F 2001/134372
USPC ......... 349/141, 139, 143, 136, 138, 187, 48; 438/30
See application file for complete search history.

(56) References Cited

U.S. PATENT DOCUMENTS

2013/0342774 A1* 12/2013 Choi ................. G02F 1/134363
349/33

* cited by examiner

*Primary Examiner* — Thoi Duong
(74) *Attorney, Agent, or Firm* — Andrew C. Cheng

(57) ABSTRACT

The present invention discloses a liquid crystal display, a method improving the response time thereof, and an array substrate. The array substrate comprises a substrate and multiple pixel units provided in the array on the substrate. Each said pixel unit comprises a first pixel electrode and a second pixel electrode that are used to generate a first electric field to control liquid crystal molecules deflected from an initial direction to a predetermined angle spaced from each other provided along a first direction, and a third pixel electrode and a fourth pixel electrode that are used to generate a second electric field to control liquid crystal molecules deflected from the predetermined angle to the initial direction spaced from each other provided along a second direction. Compared with the prior art, the present invention can improve the response time of the liquid crystal display, thereby improving the display quality.

8 Claims, 4 Drawing Sheets

LIQUID CRYSTAL DISPLAY, A METHOD IMPROVING THE RESPONSE TIME THEREOF, AND AN ARRAY SUBSTRATE

BACKGROUND OF THE INVENTION

1. Field of the Invention

The present invention relates to the field of displaying techniques, and in particular to a liquid crystal display, a method improving the response time thereof, and an array substrate.

2. The Related Arts

Currently, liquid crystal display has two main display technologies, one is in-plane switching (IPS) technology, and the other is vertical alignment (VA) technology. Wherein, IPS mode liquid crystal display has been widely applied due to fast response, large viewing angle, fine color, etc. Recently, in order to improve low numerical aperture and the transmittance of the IPS mode liquid crystal display, the fringe field switching (FFS) mode liquid crystal display is developed. The actual application can also mix IPS mode and FFS mode in order to meet the requirements of liquid crystal display for different display effects.

The response time of liquid crystal display (including IPS mode and FFS mode hybrid liquid crystal display) includes rising time and falling time. The rising time is the time of liquid crystal display turning from dark state to bright state, that is the conversion time of liquid crystal molecules in the liquid crystal layer deflecting from all-black of the initial direction (or initial orientation position) to all-white of predetermined angle, which is mainly decided by the rotate speed of the liquid crystal molecules affected by the electric field. The falling time is the time of liquid crystal display turning from bright state to dark state, that is the conversion time of liquid crystal molecules deflecting from all-white to all-black, which is mainly decided by the speed of the liquid crystal molecules rotating to the initial orientation position affected by the anchoring force during alignment. Therefore, when in a liquid crystal layer with high viscosity or in a low temperature environment, the falling time of the liquid crystal molecules will slow down, thereby affecting the display quality.

In summary, the liquid crystal display according to the prior art has slow response time in liquid crystal layer with high viscosity or in low temperature environment, thereby affecting the display quality.

SUMMARY OF THE INVENTION

The technical issue to be solved by the present invention is to provide a liquid crystal display, a method improving the response time thereof, and an array substrate, which can improve the response time of the liquid crystal display in a liquid crystal layer with high viscosity or in a low temperature environment, thereby improving the display quality.

To achieve the above technical issue, one aspect of the present invention is to provide a array substrate, comprising a substrate and multiple pixel units provided in the array on the substrate; each said pixel unit comprising a first pixel electrode and a second pixel electrode spaced from each other provided along a first direction, and a third pixel electrode and a fourth pixel electrode spaced from each other provided along a second direction; wherein, the first pixel electrode and the second pixel electrode are used to generate a first horizontal electric field to control liquid crystal molecules deflected from an initial direction to a predetermined angle, the third pixel electrode and the fourth pixel electrode are used to generate a second horizontal electric field to control liquid crystal molecules deflected from the predetermined angle to the initial direction.

Wherein, the first direction is perpendicular to the second direction so that anyone of the first pixel electrode and the second pixel electrode is perpendicular to anyone of the third pixel electrode and the fourth pixel electrode.

Wherein, the first pixel electrode and the second pixel electrode are provided at the same layer; the third pixel electrode and the fourth pixel electrode are provided at the same layer, which are separated from the first pixel electrode and the second pixel electrode by an insulating layer.

Wherein, each said pixel unit further comprises a common electrode, a first insulating layer, and a second insulating layer provided on the substrate in sequence, the third pixel electrode and the fourth pixel electrode are located between the first insulating layer and the second insulating layer, the first pixel electrode and the second pixel electrode are located at the side of the second insulating layer away from the third pixel electrode and the fourth pixel electrode.

Optionally, each said pixel unit further comprises a common electrode and a first insulating layer provided on the substrate in sequence, the first pixel electrode, the second pixel electrode, the third pixel electrode, and the fourth pixel electrode are located at the side of the first insulating layer away from the common electrode.

To achieve the above technical issue, another aspect of the present invention is to provide a liquid crystal display, comprising the array substrate as mentioned in the above technical proposal, a color filter substrate, and a liquid crystal layer provided between the array substrate and the color filter substrate.

To achieve the above technical issue, another aspect of the present invention is to provide a method improving the response time of a liquid crystal display, the liquid crystal display comprising a first pixel electrode and a second pixel electrode spaced from each other provided along a first direction, and a third pixel electrode and a fourth pixel electrode spaced from each other provided along a second direction perpendicular to the first direction, wherein, the method comprises the following steps: during rising response period, a first horizontal electric field being formed between the first pixel electrode and the second pixel electrode so that liquid crystal molecules deflect from an initial direction to a predetermined angle; during falling response period, a second horizontal electric field being formed between the third pixel electrode and the fourth pixel electrode so that liquid crystal molecules deflect from the predetermined angle to the initial direction.

Wherein, the step, during rising response period, a first horizontal electric field being formed between the first pixel electrode and the second pixel electrode so that liquid crystal molecules deflect from an initial direction to a predetermined angle, further comprises: applying a first voltage to the first pixel electrode, and applying a second voltage with the same value as but the opposite polarity to the first voltage to the second pixel electrode.

Wherein, the liquid crystal display further comprises a lower substrate, and a common electrode provided in insulation between the lower substrate, and the first pixel electrode and the second pixel electrode, characterized in that, the step, applying a first voltage to the first pixel electrode, and applying a second voltage with the same value as but the opposite polarity to the first voltage to the second pixel electrode, further comprises the following step: applying a zero voltage to the common electrode.

Wherein, the step, during falling response period, a second horizontal electric field being formed between the third pixel electrode and the fourth pixel electrode so that liquid crystal molecules deflect from the predetermined angle to the initial direction, further comprises: applying a third voltage to the third pixel electrode, and applying a fourth voltage with the same value as but the opposite polarity to the third voltage to the fourth pixel electrode.

The beneficial effects of the present invention are as follows. The present invention provides an array substrate, comprising a substrate and multiple pixel units provided in the array on the substrate; each said pixel unit comprising a first pixel electrode and a second pixel electrode spaced from each other provided along a first direction, and a third pixel electrode and a fourth pixel electrode spaced from each other provided along a second direction; wherein, the first pixel electrode and the second pixel electrode are used to generate a first horizontal electric field to control liquid crystal molecules deflected from an initial direction to a predetermined angle, the third pixel electrode and the fourth pixel electrode are used to generate a second horizontal electric field to control liquid crystal molecules deflected from the predetermined angle to the initial direction. Compared with the prior art, during the falling response period, the present invention can improve the response time of the liquid crystal display in a liquid crystal layer with high viscosity or in a low temperature environment, thereby improving the display quality, through the second horizontal electric field, which is generated between the third pixel electrode and the fourth pixel electrode, controlling liquid crystal molecules deflected from the predetermined angle to the initial direction.

DETAILED DESCRIPTION OF THE PREFERRED EMBODIMENTS

Figure 1:
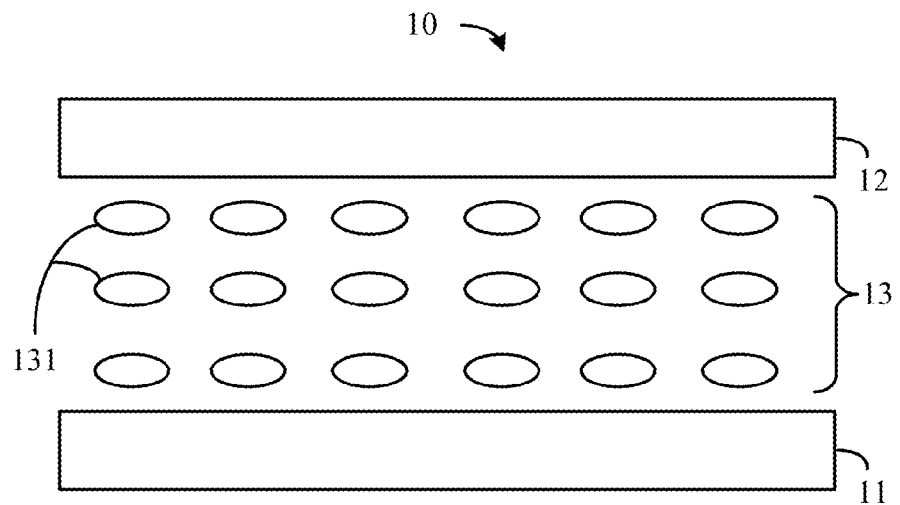
FIG. 1 is a schematic view illustrating the structure of the liquid crystal display according to the present invention.

Referring to FIG. 1, FIG. 1 is a schematic view illustrating the structure of the liquid crystal display according to the present invention. As shown in FIG. 1, the liquid crystal display 10 comprises an array substrate 11, a color filter substrate 12, and a liquid crystal layer 13 provided between the array substrate 11 and the color filter substrate 12.

Wherein, the array substrate 11 is a multilayer substrate optionally including or not including color filter or black matrix.

Wherein, the liquid crystal layer 13 comprises a large number of liquid molecules 131. The liquid molecules 131 applied to the liquid crystal display 10 can be divided into two categories: one is an organic compound presented as liquid phase only within a certain temperature range, which is called as thermotropic liquid crystal molecules; the other is a compound presented as liquid phase after being dissolved in water or organic solvent, which is called as lyotropic liquid crystal molecules.

Figure 2:
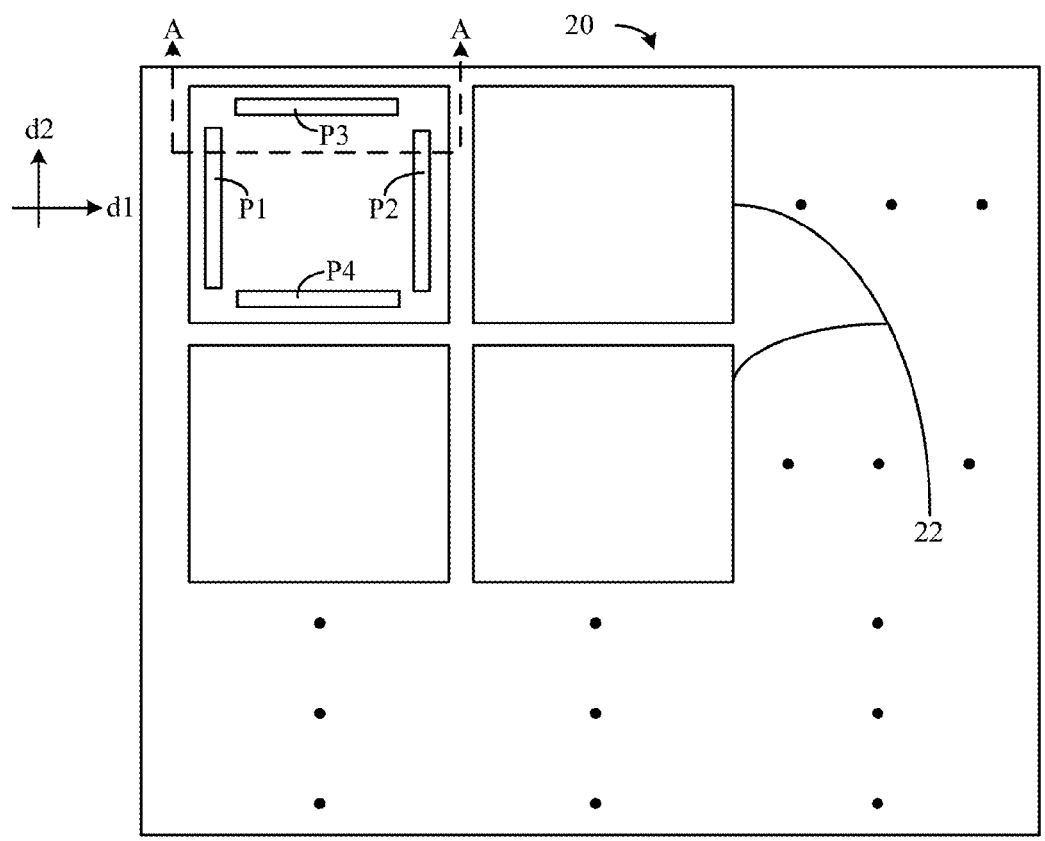
FIG. 2 is a schematic top view illustrating the structure of the array substrate according to one embodiment of the present invention.

Referring to FIG. 2, FIG. 2 is a schematic top view illustrating the structure of the array substrate according to one embodiment of the present invention. The array substrate 20 as shown in FIG. 2 has the similar structure to the array substrate 11 as mentioned above. As shown in FIG. 2, the array substrate 20 comprises a substrate 21 (referring to FIG. 5 or 6) and multiple pixel units 22 provided in the array on the substrate 21. Each said pixel unit 22 comprises a first pixel electrode P1 and a second pixel electrode P2 spaced from each other provided along a first direction d1, and a third pixel electrode P3 and a fourth pixel electrode P4 spaced from each other provided along a second direction d2. Wherein, the first pixel electrode P1 and the second pixel electrode P2 are used to generate a first horizontal electric field to control liquid crystal molecules 131 (referring to FIG. 1) deflected from an initial direction to a predetermined angle, the third pixel electrode P3 and the fourth pixel electrode P4 are used to generate a second horizontal electric field to control liquid crystal molecules 131 deflected from the predetermined angle to the initial direction.

Wherein, the substrate 21 is optionally glass substrate or plastic substrate. The first pixel electrode P1 and the second pixel electrode P2 are optionally parallel or non-parallel to each other, FIG. 2 shows parallel. The third pixel electrode P3 and the fourth pixel electrode P4 are optionally parallel or non-parallel to each other, FIG. 2 shows parallel.

Figure 3:
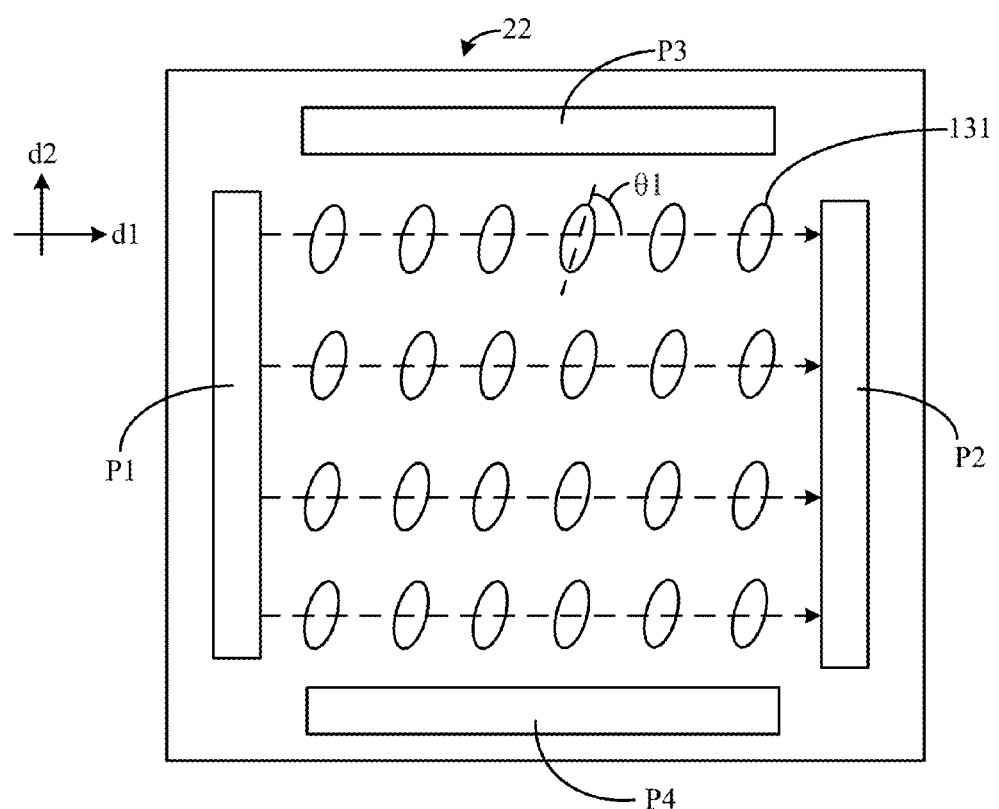
FIG. 3 is a schematic view illustrating the structure of the first pixel electrode and the second pixel electrode as in FIG. 2, and liquid crystal molecules in the initial direction.
Figure 4:
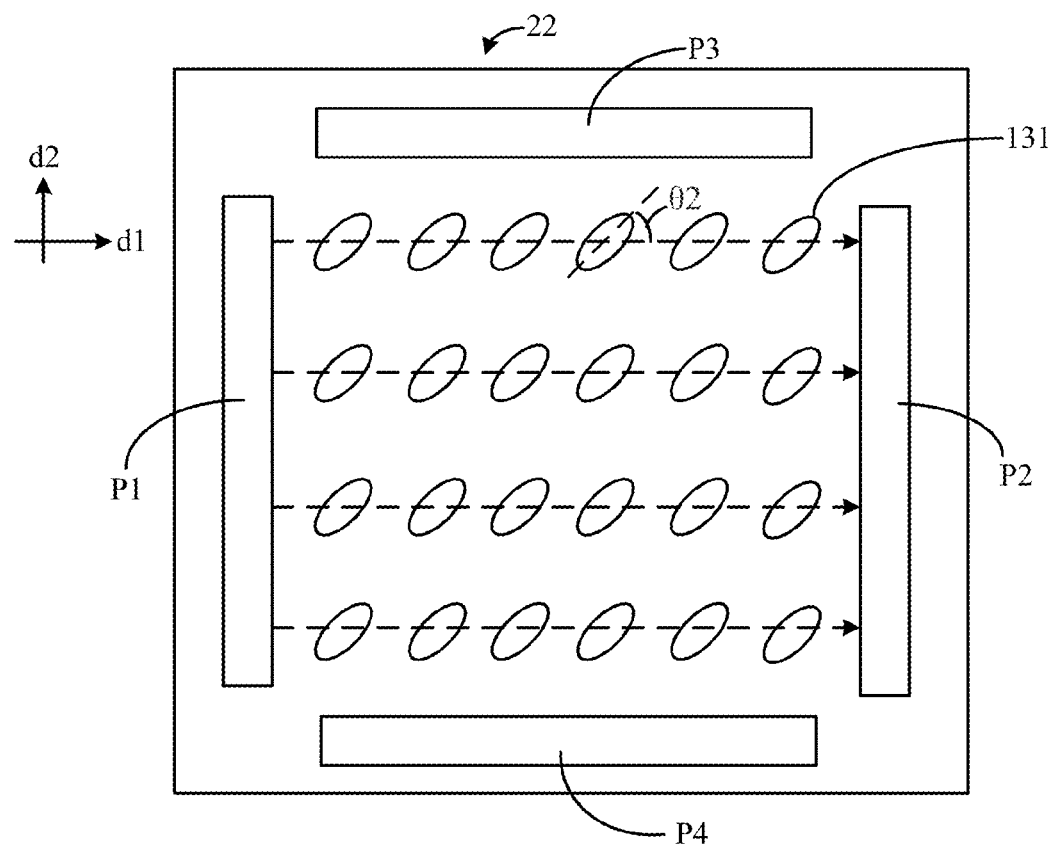
FIG. 4 is a schematic view illustrating the structure of the first pixel electrode and the second pixel electrode as in FIG. 2, and liquid crystal molecules in the predetermined angle.

Referring to FIGS. 3 and 4, FIG. 3 is a schematic view illustrating the structure of the first pixel electrode and the second pixel electrode as in FIG. 2, and liquid crystal molecules in the initial direction. FIG. 4 is a schematic view illustrating the structure of the first pixel electrode and the second pixel electrode as in FIG. 2, and liquid crystal molecules in the predetermined angle. As shown in FIGS. 3 and 4, the first horizontal electric field generated between the first pixel electrode P1 and the second pixel electrode P2 is the same as the first direction d1, in the other embodiment, it can be optionally opposite to the first direction d1. Wherein, the alignment film (or orientation film, not shown in diagram) of the liquid crystal display 10 has a certain anchoring force to the liquid crystal molecules 131 after a specific processing technology, so that the liquid crystal molecules 131 have a certain pre-tilt angle, which also called as initial orientation position or initial direction. As shown in FIG. 3, the angle of the initial direction of the liquid crystal molecules 131 with respect to the first horizontal electric field is $\theta1$, the liquid crystal molecules 131 makes the liquid crystal display 10 in the dark state at this time. As shown in FIG. 4, the liquid crystal molecules 131 makes the liquid crystal display 10 in the bright state, at this time, the angle of the liquid crystal molecules 131 with respect to the first horizontal electric field rotates to a predetermined angle $\theta2$.

Wherein, it can be understood that the first horizontal electric field between the first pixel electrode P1 and the second pixel electrode P2 are used to make the liquid crystal display 10 turn from dark state to bright state, and the second horizontal electric field between the third pixel electrode P3 and the fourth pixel electrode P4 are used to make the liquid crystal display 10 turn from bright state to dark state. Therefore, the first pixel electrode P1, the second pixel electrode P2, the third pixel electrode P3, and the fourth pixel electrode P4 do not work at the same time. Furthermore, anyone of the first pixel electrode and the second pixel electrode and anyone of the third pixel electrode and the fourth pixel electrode are provided with an interval.

Referring to FIG. 2 again, the first direction d1 is perpendicular to the second direction d2, so that anyone of the first pixel electrode P1 and the second pixel electrode P2 is perpendicular to anyone of the third pixel electrode P3 and the fourth pixel electrode P4. In the other embodiment, it can also select that the first direction d1 is non-perpendicular to the second direction d2.

Figure 5:
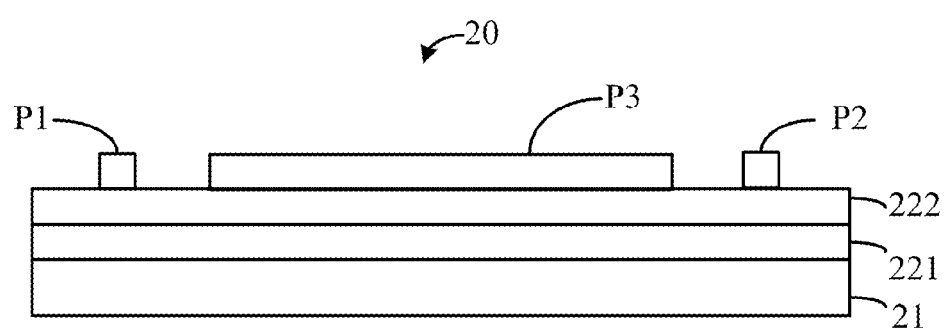
FIG. 5 is a schematic view illustrating the structure of the array substrate as in FIG. 2 along the A-A cross section.

Referring to FIG. 5, FIG. 5 is a schematic view illustrating the structure of the array substrate as in FIG. 2 along the A-A cross section. As shown in FIG. 5, each said pixel unit 22 further comprises a common electrode 221 and a first insulating layer 222 provided on the substrate 21 in sequence. Wherein, the first pixel electrode P1, the second pixel electrode P2, the third pixel electrode P3, and the fourth pixel electrode P4 (not shown in FIG. 5) are located at the side of the first insulating layer 222 away from the common electrode 221.

Wherein, the common electrode 221, the first pixel electrode P1, the second pixel electrode P2, the third pixel electrode P3, and the fourth pixel electrode P4 is optionally metal or transparent conductive material. The first insulating layer 222 is optionally silicon oxide ($SiO_x$) material and/or silicon nitride ($SiN_x$) material.

Wherein, during the rising response period which the liquid crystal display 10 turns from dark state to bright state, when applying voltage to the first pixel electrode P1 and the second pixel electrode P2 to form the first horizontal electric field, it can select that the first voltage applied to the first pixel electrode P1 and the second voltage applied to the second pixel electrode P2 have the same value but the opposite polarity. Furthermore, the voltage on the common electrode 221 is used to be zero potential. At this time, there is also a horizontal electric field having the same direction as the first horizontal electric field present within the first pixel electrode P1, the second pixel electrode P2, and the common electrode 221, so that the electric field intensity of the pixel unit 22 is increased during the rising response period, which can decrease the first voltage and the second voltage applied to the first pixel electrode P1 and the second pixel electrode P2, further reducing the power consumption.

During the falling response period which the liquid crystal display 10 turns from bright state to dark state, when applying voltage to the third pixel electrode P3 and the fourth pixel electrode P4 to form the second horizontal electric field, it can select that the third voltage applied to the third pixel electrode P3 and the fourth voltage applied to the fourth pixel electrode P4 have the same value but the opposite polarity. At this time, the liquid crystal molecules 131 it not only affected by the anchoring force in the initial orientation, but also by the electric field force of the second horizontal electric field, so that the force on the liquid crystal molecules 131 is enhanced, which greatly reduce the falling time during forcing the liquid crystal molecules 131 to rotate to the initial direction. Therefore, even in the liquid crystal layer with high viscosity or in the low temperature environment, the liquid crystal display 10 can also maintain the fast response time, and further improve the display quality, so that the image lag and other undesirable phenomena will not appear. Furthermore, the voltage on the common electrode 221 is used to be zero potential. At this time, there is also a horizontal electric field having the same direction as the second horizontal electric field present within the third pixel electrode P3, the fourth pixel electrode P4, and the common electrode 221, so that the electric field intensity of the pixel unit 22 is increased during the falling response period, which can decrease the third voltage and the fourth voltage applied to the third pixel electrode P3 and the fourth pixel electrode P4, further reducing the power consumption.

Figure 6:
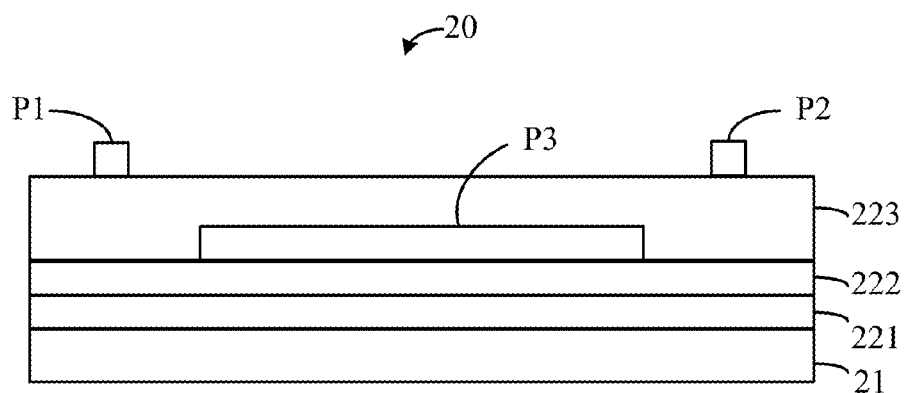
FIG. 6 is another schematic view illustrating the structure of the array substrate as in FIG. 2 along the A-A cross section.

In the other embodiment, in order to reduce the interference within the first pixel electrode P1, the second pixel electrode P2, the third pixel electrode P3, and the fourth pixel electrode P4 caused by being provided at the same layer, it can choose that the first pixel electrode P1 and the second pixel electrode P2 are provided at the same layer; the third pixel electrode P3 and the fourth pixel electrode P4 are provided at the same layer, which are separated from the first pixel electrode P1 and the second pixel electrode P2 by an insulating layer (as the second insulating layer 223 shown in FIG. 6).

Referring to FIG. 6, FIG. 6 is another schematic view illustrating the structure of the array substrate as in FIG. 2 along the A-A cross section. The structure shown in FIG. 6 is a specific embodiment of the first pixel electrode P1, the second pixel electrode and the third pixel electrode P3, the fourth pixel P4 the electrode provided in different layers. As shown in FIG. 6, each pixel unit 22 further comprises a common electrode 221, a first insulating layer 222, and a second insulating layer 223 provided on the substrate 21 in sequence. The third pixel electrode P3 and the fourth pixel electrode P4 are located between the first insulating layer 222 and the second insulating layer 223, the first pixel electrode P1 and the second pixel electrode P2 are located at the side of the second insulating layer 223 away from the third pixel electrode P3 and the fourth pixel electrode P4.

Wherein, the second insulating layer 223 is optionally silicon oxide ($SiO_x$) material and/or silicon nitride ($SiN_x$) material.

It can be understood that, in the other embodiment, the first pixel electrode P1 and the second pixel electrode P2 are located between the first insulating layer 222 and the second insulating layer 223, the third pixel electrode P3 and the fourth pixel electrode P4 are located at the side of the second insulating layer 223 away from the first pixel electrode P1 and the second pixel electrode P2.

Figure 7:
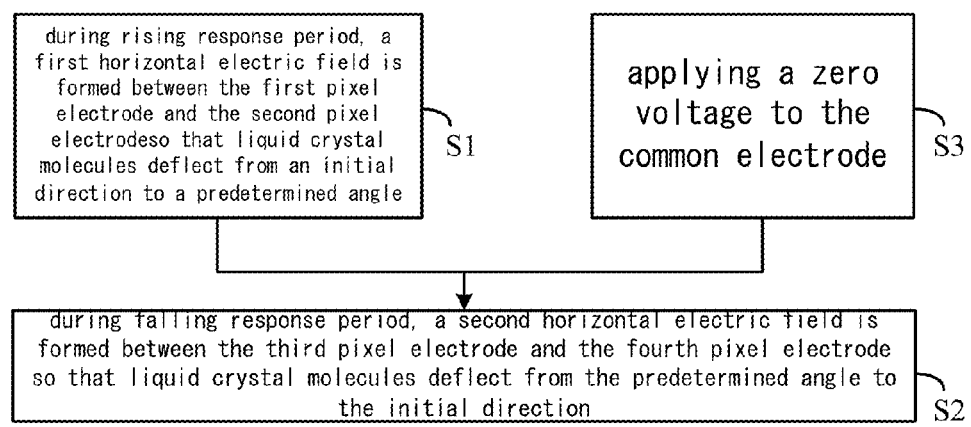
FIG. 7 is a flow diagram of a method improving the response time of a liquid crystal display according to one embodiment of the present invention.

Referring to FIG. 7, FIG. 7 is a flow diagram of a method improving the response time of a liquid crystal display according to one embodiment of the present invention. Wherein, the liquid crystal display as shown in FIG. 7 has similar structure to the liquid crystal display 10 as mentioned above, which also comprises the array substrate 20, using the same mark to describe here. The liquid crystal display comprises a first pixel electrode P1 and a second pixel electrode P2 spaced from each other provided along a first direction d1, and a third pixel electrode P3 and a fourth pixel electrode P4 (referring to FIG. 2) spaced from each other provided along a second direction d2 perpendicular to the first direction d1. As shown in FIG. 7, the method comprises the following steps:

S1: during rising response period, a first horizontal electric field is formed between the first pixel electrode P1 and the second pixel electrode P2 so that liquid crystal molecules 113 (referring to FIG. 1) deflect from an initial direction (referring to FIG. 2) to a predetermined angle (referring to FIG. 4).

S2: during falling response period, a second horizontal electric field is formed between the third pixel electrode P3 and the fourth pixel electrode P4 so that liquid crystal molecules 113 deflect from the predetermined angle to the initial direction.

Wherein, step S1 and step S2 respectively correspond to the operation of the first pixel electrode P1, the second pixel electrode P2, and the third pixel electrode P3, the fourth pixel electrode P4 during rising response period and falling response period, which is not repeated here.

Wherein, the step S1 further comprises: applying a first voltage to the first pixel electrode P1, and applying a second voltage with the same value as but the opposite polarity to the first voltage to the second pixel electrode P2.

Wherein, the liquid crystal display further comprises a lower substrate (the same as the substrate 21 of the array substrate 20, referring to FIG. 5 or 6), and a common electrode 221 (referring to FIG. 5 or 6) provided in insulation between the lower substrate 21, and the first pixel electrode P1 and the second pixel electrode P2. Furthermore, while implementing the step S1, the method further comprises the following step:

S3: applying a zero voltage to the common electrode.

Wherein, the step S3 generates a horizontal electric field with the same direction as the first horizontal electric field within the first pixel electrode P1, the second pixel electrode P2, and the common electrode 221, so that the electric field intensity on the liquid crystal molecules 131 is enhanced during the rising response period, which can decrease the first voltage and the second voltage applied to the first pixel electrode P1 and the second pixel electrode P2, further reducing the power consumption.

Wherein, the step S2 further comprises: applying a third voltage to the third pixel electrode P3, and applying a fourth voltage with the same value as but the opposite polarity to the third voltage to the fourth pixel electrode P4.

Furthermore, while implementing the step S2, the method implements the step S3. It can be understood that it can also decrease the third voltage and the fourth voltage applied to the third pixel electrode P3 and the fourth pixel electrode P4, further reducing the power consumption.

Distinguished to the prior art, the present invention provides a liquid crystal display comprising an array substrate. The array substrate further comprises a substrate and multiple pixel units provided in the array on the substrate. Each said pixel unit comprises a first pixel electrode and a second pixel electrode spaced from each other provided along a first direction, and a third pixel electrode and a fourth pixel electrode spaced from each other provided along a second direction. When rising the response time of the liquid crystal display, respectively apply the voltage to the first pixel electrode and the second pixel electrode to generate the first horizontal electric field to control liquid crystal molecules deflected from an initial direction to a predetermined angle; apply the voltage to the third pixel electrode and the fourth pixel electrode to generate the second horizontal electric field to control liquid crystal molecules recover from the predetermined angle to the initial direction. Compared with the prior art, during the falling response period, the present invention can improve the response time of the liquid crystal display in a liquid crystal layer with high viscosity or in a low temperature environment, thereby improving the display quality, through the second horizontal electric field, which is generated between the third pixel electrode and the fourth pixel electrode, controlling liquid crystal molecules deflected from the predetermined angle to the initial direction. Moreover, during rising and falling response period, it can enhance the electric field intensity in the rising and falling response period through applying zero voltage to the common electrode, which can reduce the voltage applied to the first pixel electrode P1, the second pixel electrode P2, the third pixel electrode P3, and the fourth pixel electrode P4 and further decrease the power consumption.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An array substrate, comprising a substrate and multiple pixel units provided in the array on the substrate; each said pixel unit comprising a first pixel electrode and a second pixel electrode spaced from each other provided along a first direction, a third pixel electrode and a fourth pixel electrode spaced from each other provided along a second direction, and a common electrode and a first insulating layer provided on the substrate in sequence;

wherein, the first pixel electrode, the second pixel electrode, the third pixel electrode, and the fourth pixel electrode are located at the side of the first insulating layer away from the common electrode;

wherein, the first pixel electrode and the second pixel electrode are used to generate a first horizontal electric field to control liquid crystal molecules deflected from an initial direction to a predetermined angle, the third pixel electrode and the fourth pixel electrode are used to generate a second horizontal electric field to control liquid crystal molecules deflected from the predetermined angle to the initial direction.

2. The array substrate as claimed in claim 1, characterized in that, the first direction is perpendicular to the second direction so that anyone of the first pixel electrode and the second pixel electrode is perpendicular to anyone of the third pixel electrode and the fourth pixel electrode.

3. The array substrate as claimed in claim 1, characterized in that, the first pixel electrode and the second pixel electrode are provided at the same layer; the third pixel electrode and the fourth pixel electrode are provided at the same layer, which are separated from the first pixel electrode and the second pixel electrode by an insulating layer.

4. The array substrate as claimed in claim 1, characterized in that, each said pixel unit further comprises the common electrode, the first insulating layer, and a second insulating layer provided on the substrate in sequence, the third pixel electrode and the fourth pixel electrode are located between the first insulating layer and the second insulating layer, the first pixel electrode and the second pixel electrode are located at the side of the second insulating layer away from the third pixel electrode and the fourth pixel electrode.

5. A liquid crystal display, comprising the array substrate as claimed in claim 1, a color filter substrate, and a liquid crystal layer provided between the array substrate and the color filter substrate.

6. A method improving the response time of a liquid crystal display, the liquid crystal display comprising a first pixel electrode and a second pixel electrode spaced from each other provided along a first direction, and a third pixel electrode and a fourth pixel electrode spaced from each other provided along a second direction perpendicular to the first direction, wherein, the method comprises the following steps:

during rising response period, applying a first voltage to the first pixel electrode, and applying a second voltage with the same value as but the opposite polarity to the first voltage to the second pixel electrode, a first horizontal electric field being formed between the first pixel electrode and the second pixel electrode so that liquid crystal molecules deflect from an initial direction to a predetermined angle;

during falling response period, a second horizontal electric field being formed between the third pixel electrode and the fourth pixel electrode so that liquid crystal molecules deflect from the predetermined angle to the initial direction.

7. The method as claimed in claim 6, wherein the liquid crystal display further comprises a lower substrate, and a common electrode provided in insulation between the lower substrate, and the first pixel electrode and the second pixel electrode, characterized in that, the step, applying the first voltage to the first pixel electrode, and applying the second voltage with the same value as but the opposite polarity to the first voltage to the second pixel electrode, further comprises the following step:

applying a zero voltage to the common electrode.

8. The method as claimed in claim 6, characterized in that, the step, during falling response period, the second horizontal electric field being formed between the third pixel electrode and the fourth pixel electrode so that liquid crystal molecules deflect from the predetermined angle to the initial direction, further comprises:

applying a third voltage to the third pixel electrode, and applying a fourth voltage with the same value as but the opposite polarity to the third voltage to the fourth pixel electrode.

\* \* \* \* \*